Figures 1, 2:
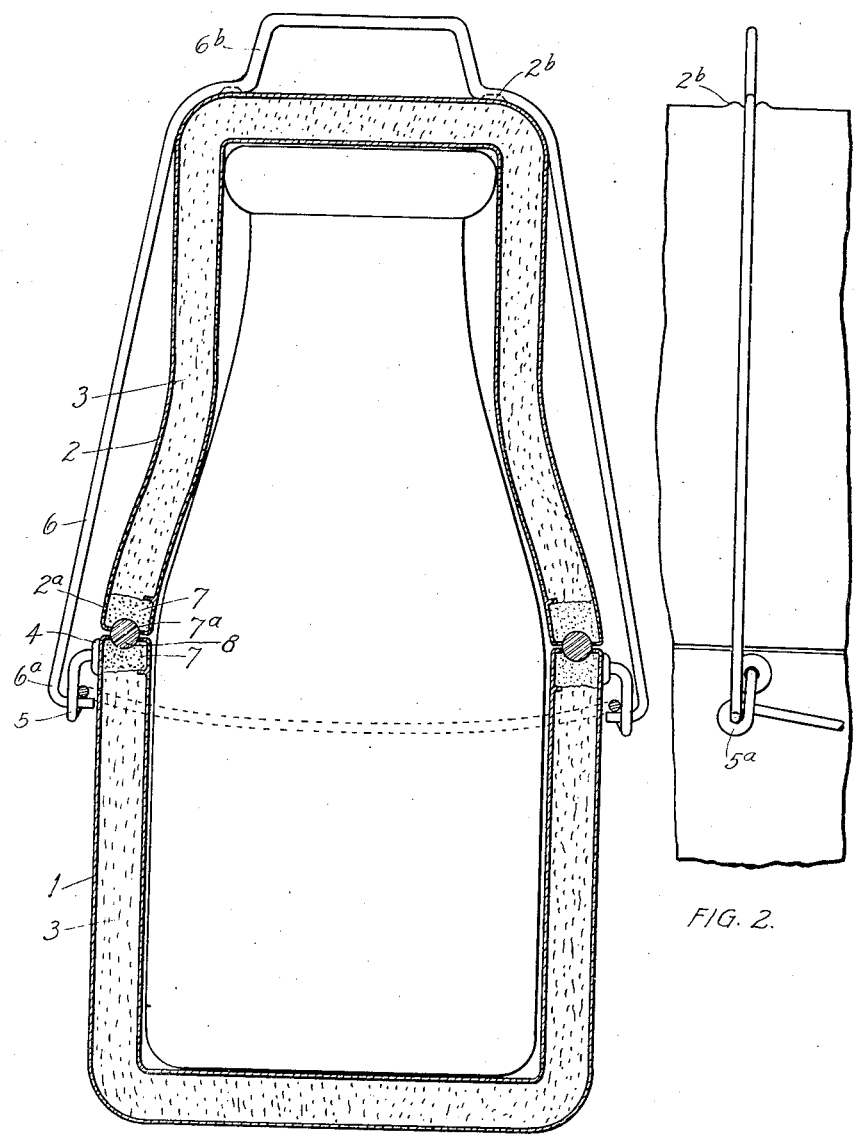

April 19, 1927.  
J. E. ABBOTT  
1,625,183  
CONTAINER FOR MILK BOTTLES  
Filed April 19, 1924

Inventor  
JOHN E. ABBOTT  
By A. B. Bowman  
Attorney

Patented Apr. 19, 1927.

1,625,183

UNITED STATES PATENT OFFICE.

JOHN E. ABBOTT, OF SPRING VALLEY, CALIFORNIA.

CONTAINER FOR MILK BOTTLES.

Application filed April 19, 1924. Serial No. 707,614.

My invention relates to containers for milk bottles, and the objects of my invention are: first, to provide heat insulating containers for receiving individual milk bottles, whereby the milk contained in the bottles may be kept at a substantially uniform temperature; second, to provide novel containers for vending and delivering milk in bottles, whereby the milk is kept cool and sanitary; third, to provide a container of this class which is separated at the middle and conforms substantially with the shape of the milk bottle adapted to be contained therein; fourth, to provide novel means for securing the separate members of the container together and for carrying the container; fifth, to provide a novelly constructed container for milk bottles, and sixth, to provide such a container which is particularly simple and economical of construction, durable, practical, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a longitudinal sectional elevational view of my container for milk bottles with the section taken through the middle thereof, showing certain parts and portions in elevation to facilitate the illustration, and showing a conventional milk bottle positioned therein, and Fig. 2 is a fragmentary side elevational view thereof, showing particularly the handle means for securng the separate members of the container together.

Like characters of reference refer to similar parts and portions throughout the several views of the drawings.

The lower container section 1, upper container section 2, heat-insulating material 3, lugs 4, container-section contracting lever 5, handle member 6, plastic material 7, and the gasket 8, constitute the principal parts and portions of my container for milk bottles.

The lower and upper container sections 1 and 2, respectively, are of double-walled construction, preferably made of formed sheet metal of low heat conductivity and preferably coated with a heat resisting and reflecting substance. A heat insulating material 3, such as cork, is positioned between the inner and outer wall members of the container sections. The lower container section 1 is adapted to enclose the lower straight portion of the conventional milk bottle, while the cover or upper container section 2, shaped to conform substantially in curvature with the upper half of the milk bottle, is positioned over said upper portion of the milk bottle and engages the upper ledge of the lower container section. The inner and outer wall members of both container sections are preferably made separate members, the upper ends of the wall members of the lower container section, as well as the lower ends of the wall members of the upper container section, being bent or crimped toward each other to form retaining flanges for retaining a plastic material 7 adapted to be positioned respectively in the open upper and lower ends of the lower and upper container sections, and between the inner and outer wall members of each. The continuity of metal at said ends of the container sections is broken to reduce the conduction of heat from the outer to the inner or inner to the outer wall members to a minimum. Said plastic material 7 is made of heat insulating material and retains the wall members in position relatively to each other as well as retains the cork in position therebetween. At the upper end of the lower container section is provided an annular yieldable gasket 8, preferably of rubber and circular in cross-section and preferably embedded partially in the plastic material. The plastic material in the upper container section is provided with an annular channel 7ª which is adapted to receive the outer portion of the gasket 8 and seal the container sections with each other.

Near the upper portion of the outer wall member of the lower container section 1, and at substantially diametrically opposed positions, are provided lugs 4 in which are pivotally mounted the offset ends of the U-shaped cam or container-section contracting lever 5. Said lever is provided with loop portions 5ª spaced from the pivotal portions thereof, in which loop portions are pivotally mounted the inwardly bent portions 6ª at the ends of the legs of the U-shaped handle member 6, substantially as shown in the drawings. It will be noted that the loop portions of the lever 5 are so positioned relatively to the pivotal portions thereof that the pivotal ends of the handle member 6 are forced beyond the alinement with the pivotal portion of the lever 5 when said lever is forced downwardly, thus providing an over-center locking action by said lever. When the lever 5 is forced downwardly, the handle member 6 is adapted to fit snugly against the upper portion of the upper container section 2 and is adapted to be positioned laterally at its upper end in a transverse groove formed by upwardly extending ridges 2^b in the top portion of the upper container section 2. The handle member 6 is provided at its normally upper end with an upwardly offset portion 6^b, which serves as a handle for carrying the container and which also provides suitable and sufficient resiliency for the handle member 6 when tightening the same over the upper container section by means of the over-center contracting lever 5.

It will be noted that because of no sharp corners or pockets the container may be easily kept clean and therefore sanitary, which is an essential in vending or delivering milk.

It is obvious from this construction, as illustrated in the drawings and disclosed in the foregoing specification, that there is provided a container for milk bottles as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In a sectional heat insulated container for conventional milk bottles, an insulated container separated in the middle and conforming substantially with the shape of a conventional milk bottle, and a gasket interposed between the edges of the separate sections.

2. In a sectional container and carrier for conventional milk bottles, a container separated in the middle and conforming substantially with the shape of a conventional milk bottle, and combined lever and handle means in connection therewith for contractibly securing the separate sections of said container together, at the middle.

3. In a sectional heat insulating container and carrier for conventional milk bottles an insulated container, separated in the middle, at its top and bottom ends, the lower section of said container conforming at its inside substantially with the lower portion of a conventional milk bottle and the upper section thereof conforming at its inside substantially with the upper neck portion of said conventional milk bottle and a combined handle and lever pivotally mounted near the upper portion of said lower section, and a U-shaped handle member pivotally mounted at its normally lower end on said lever at a spaced distance from the pivotal mounting of the latter, said handle member being provided at its upper end with an upwardly extending handle portion.

4. In a sectional, heat insulating container and carrier for conventional milk bottles, an insulated container separated in the middle intermediate its top and bottom ends, the lower section of said container conforming at its inside substantially with the lower portion of a conventional milk bottle and the upper section thereof conforming at its inside substantially with the upper neck portion of said conventional milk bottle, and a combined over-center handle and lever means in connection with said container sections for yieldably securing the same relatively to each other.

In testimony whereof, I have hereunto set my hand at San Diego, California, this 8th day of April, 1924.

JOHN E. ABBOTT.